US009340097B2

(12) United States Patent
Van Boxtel et al.

(10) Patent No.: US 9,340,097 B2
(45) Date of Patent: May 17, 2016

(54) ASSEMBLY FOR CONNECTING TWO OBJECTS

(71) Applicant: Inalfa Roof Systems Group B.V., Venray (NL)

(72) Inventors: Eduardus Christianus Hendricus Van Boxtel, Zeeland (NL); Marcel Johan Christiaan Nellen, Merselo (NL)

(73) Assignee: Inalfa Roof Systems Group B.V., Oostrum (NL)

( * ) Notice: Subject to any disclaimer, the term of this patent is extended or adjusted under 35 U.S.C. 154(b) by 0 days.

(21) Appl. No.: 14/159,190

(22) Filed: Jan. 20, 2014

(65) Prior Publication Data
US 2014/0203598 A1 Jul. 24, 2014

(30) Foreign Application Priority Data

Jan. 22, 2013 (EP) .................................... 13152236

(51) Int. Cl.
*B60J 7/057* (2006.01)

(52) U.S. Cl.
CPC ............... *B60J 7/057* (2013.01); *B60J 7/0573* (2013.01)

(58) Field of Classification Search
CPC ......... B60J 1/2025; B60J 7/057; B60J 7/0573
USPC .............................. 296/216.01–224, 213, 214
See application file for complete search history.

(56) References Cited

U.S. PATENT DOCUMENTS

| 4,050,327 | A | * | 9/1977 | Thomas et al. .................. 74/502 |
| 5,156,482 | A | * | 10/1992 | Owings .......................... 403/43 |
| 6,056,020 | A | * | 5/2000 | Malone ......................... 138/155 |
| 6,256,960 | B1 | * | 7/2001 | Babcock et al. ............. 52/592.1 |
| 6,491,340 | B2 | * | 12/2002 | Hori et al. ..................... 296/214 |
| 2007/0024093 | A1 | | 2/2007 | Grimm | |

FOREIGN PATENT DOCUMENTS

| DE | 102010048723 | 4/2012 |
| DE | 102012006848 | 10/2013 |
| EP | 0901919 | 3/1999 |
| EP | 1747928 | 1/2007 |

OTHER PUBLICATIONS

European Search Report mailed Aug. 1, 2013 for corresponding European Application No. 13152236.9, filed Jan. 22, 2013.

* cited by examiner

*Primary Examiner* — Dennis H Pedder
(74) *Attorney, Agent, or Firm* — Steven M. Koehler; Westman, Champlin & Koehler, P.A.

(57) ABSTRACT

An assembly is provided for operatively connecting a first object which is capable of a to and fro movement, with a second object, in such a manner that the second object, when connected to the first object, will move in correspondence with the first object. The first and second objects are provided with first and second facing ends, respectively, provided with cooperating first and second coupling provisions, respectively, wherein at least one of said objects is housed in a guide. The coupling provision of at least one of said facing ends is capable of cooperation with said guide for moving said coupling provision from a first position disengaging the other coupling provision to a second position engaging the other coupling provision in which both objects are connected.

19 Claims, 4 Drawing Sheets

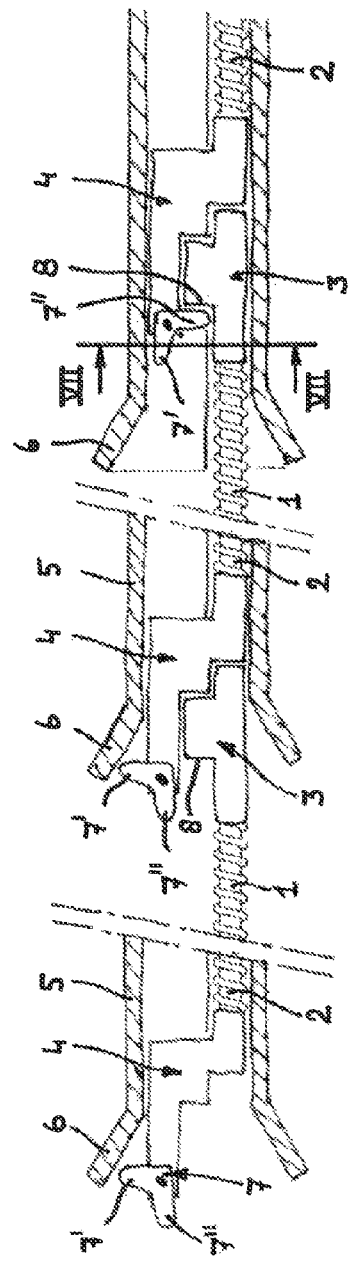
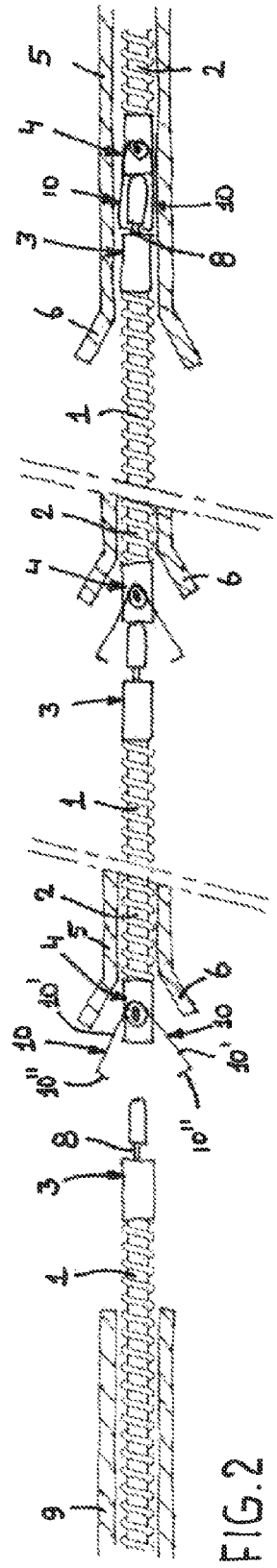
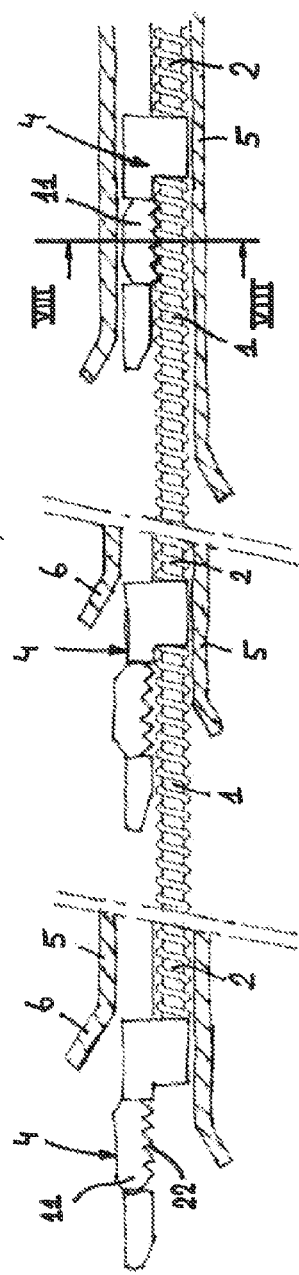
FIG. 1
FIG. 2
FIG. 3

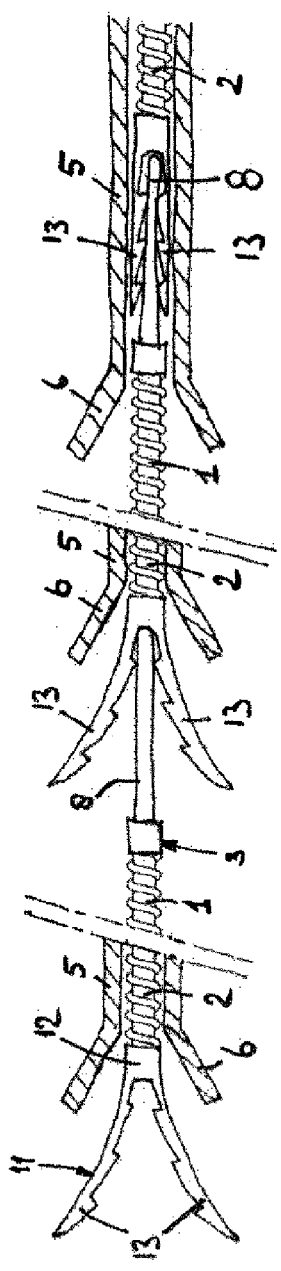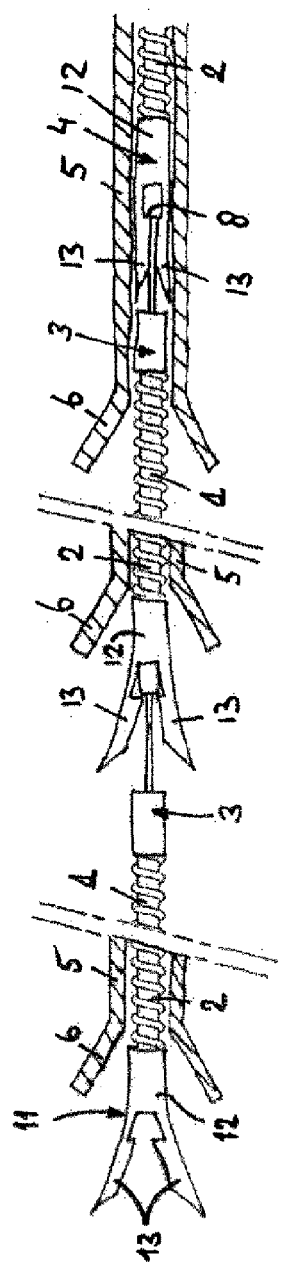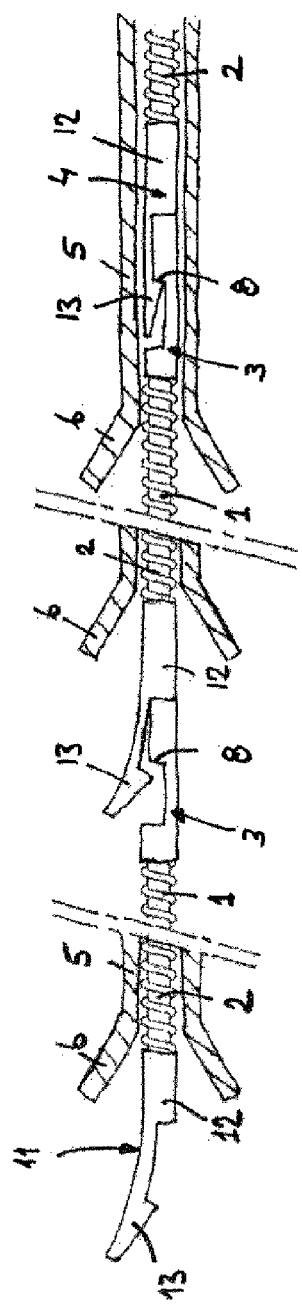

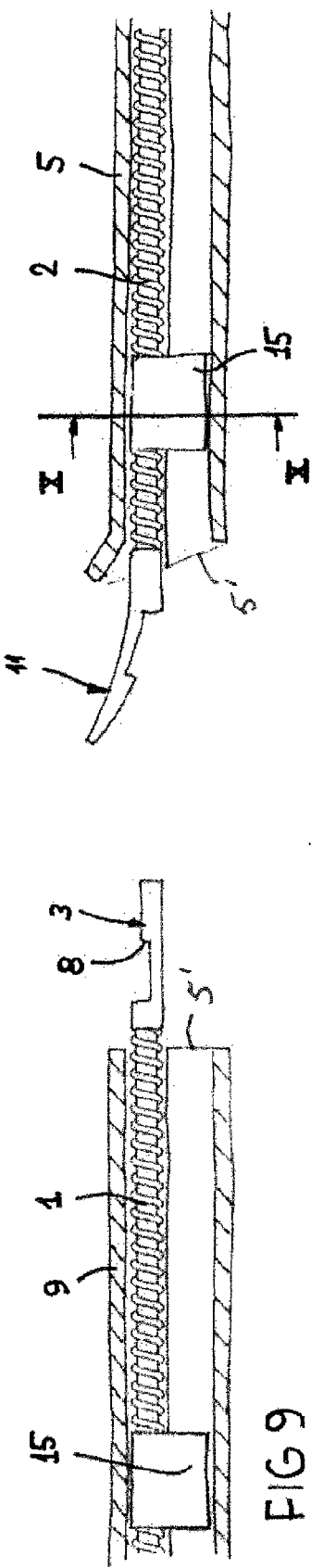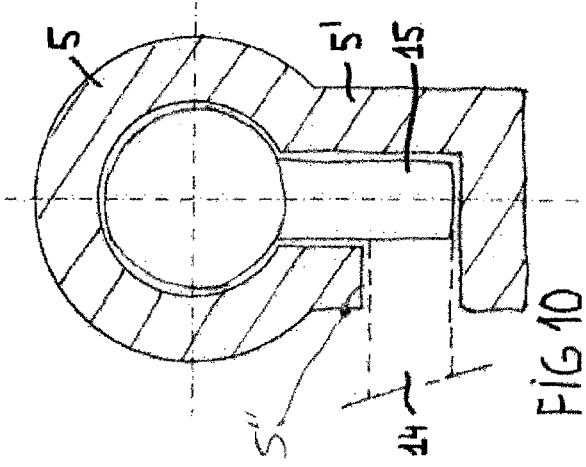

ASSEMBLY FOR CONNECTING TWO OBJECTS

BACKGROUND

The discussion below is merely provided for general background information and is not intended to be used as an aid in determining the scope of the claimed subject matter.

Aspects of the invention relate to an assembly for operatively connecting a first object which is capable of a to and fro movement, with a second object, in such a manner that the second object, when connected to the first object, will move in correspondence with the first object.

There are cases in which the movement of two objects has to be synchronized, but in which constructive members initially impede a direct connection between said two parts. For example, when the first and second object are located at opposite sides of a constructive member, the objects firstly will be positioned at their respective locations while not yet connected, after which a connection between both objects will be created through an opening in said constructive member. Examples of such cases, among others, may be found in the automotive field, especially open roof constructions for vehicles having two open roof parts before and behind, respectively, a transverse beam in the roof of the vehicle.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention includes first and second objects provided with first and second facing ends, respectively, that are provided with cooperating first and second coupling provisions, respectively, wherein at least one of said objects is housed in a guide and wherein the coupling provision of at least one of said facing ends is capable of cooperation with said guide for moving said coupling provision from a first position disengaging the other coupling provision to a second position engaging the other coupling provision in which both objects are connected.

The assembly allows automatically achieving a desired connection between both objects in a very simple manner. When, for example, the coupling provision of the object housed in said guide (hereafter "first coupling provision") is capable of said cooperation with said guide, a connection might be achieved in the following manner. Starting from the disconnected position, in which said first coupling provision is in a position in which it does not yet cooperate with the guide, the other coupling provision is moved towards said first coupling provision and will contact it. (It is noted that such a contact does not yet define the desired connection between the objects). Next both coupling provisions are moved in such a direction that the first coupling provision will be engaged by the guide and will be moved from its first position to its second position in which it in a connecting manner engages the second coupling provision and in which both objects are connected.

Although in the above example the coupling provision of the object housed in said guide is capable of said cooperation with the guide, it is conceivable too that it is the other coupling provision which is capable of such a cooperation.

In an embodiment the coupling provision which is capable of cooperation with said guide is spring loaded to a position in which both objects are not connected. This means that when said coupling provision (and thus the connected assembly of objects) is moved to a position in which the respective guide no longer engages said coupling provision, the latter will move to its first position. This allows an automatic disconnect between both objects.

It is noted however, that it is conceivable too that such a disconnect may be achieved using an appropriate tool, such as a screw driver.

In one embodiment the spring load is caused by an inherent resiliency of said coupling provision and/or additional spring(s).

In another embodiment said guide has a flared end for engaging the coupling provision which is capable of cooperation with said guide. Such a flared end allows a smooth operation of said coupling provision.

In yet another embodiment of the assembly, the coupling provision which is capable of cooperation with said guide comprises a latch which in a rotatable manner is attached to the corresponding facing end of the respective object, whereas the coupling provision of the other object is provided with a counterpart, such that the latch, when rotated through cooperation with the guide, will engage said counterpart for connecting both objects. Such a counterpart may be a protrusion behind which, or a recess in which the latch may engage. Such a latch may define an effective connection between both objects which may be achieved in an easy manner and which may be disconnected again without complex measures.

It is possible, for example, that the latch comprises two arms extending in different directions, such as for example at 90 degrees relative to each other, of which a first arm is intended to cooperate with the guide and a second arm is intended to engage the counterpart.

In another embodiment of the assembly, the coupling provision which is capable of cooperation with said guide comprises at least one gripper member attached to the corresponding facing end of the respective object, whereas the coupling provision of the other object is provided with a counterpart, such that the gripper member, when moved inwardly through cooperation with the guide, will engage said counterpart for connecting both objects.

It is conceivable that the gripper member comprises a resilient metal part with a free angled outer end. Such a resilient metal part basically functions as a spring member of which the angled outer end may be brought into engagement with the counterpart against its spring force.

It is also possible that the gripper member comprises an integral assembly of a plastic body and a resilient plastic gripper arm extending therefrom.

For further possible optimization of the connection, it is possible then that the assembly comprises two spaced gripper members which are moved towards each other through cooperation with the guide.

Also in such an embodiment using at least one gripper member, the counterpart may be a protrusion behind which, or a recess in which the at least one gripper member may engage.

It is conceivable that the at least one gripper member comprises a serration intended to engage the counterpart. Such a serration may improve the holding force between the gripper member and counterpart, such that the counterpart does not necessarily need to define a protrusion or recess but also may comprise a substantially smooth surface.

In one embodiment, however, the counter part is defined by a spiral shaped outer surface of the respective object. The serration then may cooperate with this spiral shaped outer surface (e.g. the pitch of the spiral and the pitch of the serrations may correspond).

In another embodiment of the assembly, at least one of said objects is provided with a guide member for cooperation with a corresponding part of its guide for preventing a rotation of said object. This may assure that the coupling provision will always engage each other in the correct relative position for obtaining the desired connection. Such a guide member may be part of the coupling provision but may also be attached to another part of the object.

It is possible that the first and second object are configured to move in line with each other, but it is conceivable too that the first and second object are configured to move not in line with, but in parallel with each other.

The assembly may be applied to many different fields and for example the first and second objects may be part of an open roof construction for a vehicle.

BRIEF DESCRIPTION OF THE DRAWINGS

Hereinafter aspects of the invention will be elucidated while referring to the drawing, in which:

FIG. 1 shows a first embodiment of an assembly, in a longitudinal section, schematically and in three different positions;

FIG. 2 shows a second embodiment of an assembly, in a longitudinal section, schematically and in three different positions;

FIG. 3 shows a third embodiment of an assembly, in a longitudinal section, schematically and in three different positions;

FIG. 4 shows a fourth embodiment of an assembly, in a longitudinal section, schematically and in three different positions;

FIG. 5 shows a fifth embodiment of an assembly, in a longitudinal section, schematically and in three different positions;

FIG. 6 shows a sixth embodiment of an assembly, in a longitudinal section, schematically and in three different positions;

FIG. 9 shows a seventh embodiment of an assembly, in a longitudinal section and schematically and FIG. 10 shows, on a larger scale, a cross section according to X-X in FIG. 9.

DETAILED DESCRIPTION OF THE ILLUSTRATIVE EMBODIMENTS

Figure 7:
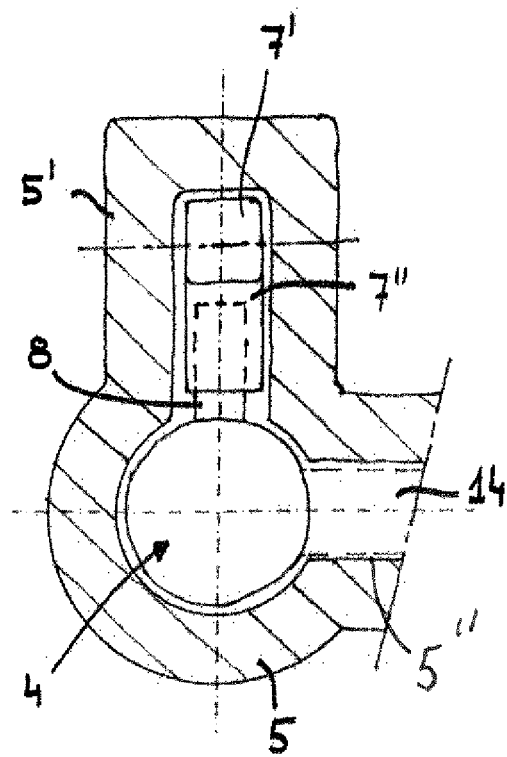
FIG. 7 shows, on a larger scale, a cross section according to VII-VII in FIG. 1.

A first embodiment of the assembly for operatively connecting two objects is illustrated in FIG. 1. In this embodiment (but also in the embodiments to follow below) a first object 1 which is capable of a to and fro movement, has to be connected with a second object 2. In the illustrated embodiments, both objects 1,2 are push-pull cables having a spiral shaped surface. These push-pull cables, in any appropriate manner, may be connected to a part to which a movement should be imparted, for example moving panels of an open roof construction for a vehicle. Such a use of push-pull cables is known per se and does not require any further clarification.

The first object 1 may be driven (for example manually or by an electric motor) and the second object 2, when operatively connected to the first object 1, will move in correspondence with the first object.

The first and second objects 1,2 are provided with first and second facing ends, respectively, provided with cooperating first and second coupling provisions 3,4, respectively. The second object 2 is housed in a guide 5 with a flared end 6.

The coupling provision 4 is intended to cooperate with the guide 5 (and flared end 6 thereof) and comprises a latch 7 which in a rotatable manner is attached to the corresponding facing end of the second object 2. The latch 7 comprises two arms 7' and 7" extending in different directions, such as for example at 90 degrees relative to each other, of which a first one 7' is intended to cooperate with the guide 5 (and the flared end 6) and a second one 7" is intended to engage behind a counterpart 8 which is part of the other coupling provision 3.

The coupling provision 4 of the second object 2 is capable of cooperation with said guide 5 and flared end 6 for moving the latch 7 from a first position disengaging the counter part 8 of the other coupling provision 3 to a second position engaging said counterpart 8 in which both objects 1,2 are connected.

The first position is illustrated in the left part of FIG. 1 in which the coupling provision 4 has such a position that the latch 7 is in a rest position out of engagement with the guide 5 or flared part 6, in which its arm 7' is directed upwardly and its arm 7" is directed to the left. The first object 1 (which also may be guided in a guide 9) is positioned at some distance from the second object 2.

Moving the first object 1 with its coupling provision 3 to the right firstly leads to a situation as illustrated in the center of FIG. 1 in which the coupling provisions 3,4 have come into contact with each other. The position of the coupling provision 4 and of the latch 7 has not yet changed.

When the first object 1 with its coupling provision 3 is moved further to the right, the coupling provision 4 also will move to the right, such that the vertically extending arm 7' will engage the flared end 6 of the guide 5 and the latch 7 will rotate anti-clockwise. As a result, the latch 7 will assume the position illustrated in the right part of FIG. 1 in which its arm 7" engages behind the counter part 8 of the coupling provision 3 of the first object 1 and both objects are operatively connected As long as the latch 7 is housed within the guide 5, the connection between the objects 1 and 2 is maintained and both objects will move together.

The counterpart 8 may define a protrusion behind which, or a recess in which the latch arm 7" may engage. Referring to FIG. 1 an additional part 3' is shown in broken lines. The counterpart 8, with the additional part 3', define a recess 20 in which the latch arm 7" may engage.

In the illustrated embodiment of the assembly the coupling provision 4 of the object 2 housed in the guide 5 is capable of said cooperation with the guide 5, but it is conceivable too that this applies for the other coupling provision 3 (such that, for example, the latch 7 would be part of said coupling provision 3 and coupling provision 4 would comprise the counterpart).

Preferably the latch 7 is spring loaded (herein schematically represented by torsion spring 7''' although other forms of springs could be used) to a position in which both objects 1,2 are not connected (position shown left in FIG. 1).

Referring to FIG. 2, an embodiment of the assembly is illustrated in which the coupling provision 4 comprises two gripper members 10 attached to the corresponding facing end of the respective object 2. The coupling provision 3 of the other object 1 again is provided with a counterpart 8 (in this embodiment embodied as a recess), such that the gripper members 10, when moved inwardly through cooperation with the guide 5 (and the flared end 6 thereof), will engage said counterpart 8 for connecting both objects 1,2.

Each gripper member 10 may comprise a resilient metal part 10' with a free angled outer end 10" and may be preloaded to the disconnected position illustrated left in FIG. 2.

In FIG. 2, center, the coupling provisions 3 and 4 just have contacted each other, and in FIG. 2, right, the connection has been established because the gripper members 10 have been moved inwardly by the guide 5 (and its flared part 6) to engage the counterpart 8.

In the embodiment according to FIG. 3 there is provided only one gripper member 11 which may move inwardly toward a longitudinal axis of the guide and relative to the remainder of the coupling provision 4 when engaged by the flared end 6 of the guide 5. The first object 1 has an outer end functioning as coupling provision 3 without use of special parts. The gripper member 11 comprises a serration 22 intended to engage the spiral shaped outer surface of the first body 1 (FIG. 3, right). The gripper member 11 may rotate or translate relative to the remainder of the respective coupling provision 4.

In the embodiments according to FIGS. 4-6 each gripper member 11 comprises an integral assembly of a plastic body 12 and one or two resilient plastic gripper arms 13 extending therefrom. In FIG. 4 there are two gripper arms 13 with serrations and the counter part 8 of the coupling provision 3 of the first body 1 has a substantially smooth surface. In FIG. 5 there also are two gripper arms 13 which will cooperate with a counterpart 8 defining a recess or protrusion. In FIG. 6 there only is one gripper arm 13.

Figure 8:
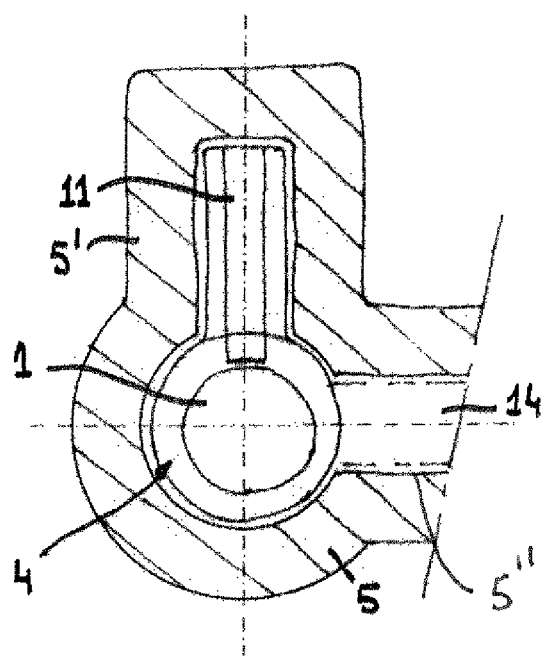
FIG. 8 shows, on a larger scale, a cross section according to VIII-VIII in FIG. 3.

The cross sections illustrated in FIGS. 7 and 8 not only show the components elucidated above, but also show a bridge 14 attached to the coupling provision 4 of the second object 2. Such a bridge 14 may be used to drive a second object 2 which does not move in line (but in parallel) with the first object 1. For accommodation of such a bridge 14 the guide 5 will be provided with a corresponding slot 5" extending longitudinally.

FIG. 9 shows an embodiment which basically corresponds with the embodiment according to FIG. 6. However, in this embodiment both the objects 1 and 2 additionally are provided with a guide member 15 for cooperation with a corresponding part 5' (FIG. 10) of the respective guide 5 (or 9) for preventing a rotation of said object 1,2. Such guide members 15 also could be provided in the embodiments according to FIGS. 4 and 5. In the embodiments according to FIGS. 1-3 they are not needed, because there the coupling provisions already protrude from said objects and are housed in corresponding guide parts 5' (see FIGS. 7 and 8) of the guide 5 (or 9).

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

The invention claimed is:

1. An assembly for operatively connecting a first push/pull cable which is capable of a to and fro movement, with a second push/pull cable, in such a manner that the second push/pull cable, when connected to the first push/pull cable, will move in correspondence with the first push/pull cable, wherein the first and second push/pull cables are provided with first and second facing ends, respectively, provided with cooperating first and second coupling provisions, respectively, wherein at least one of said push/pull cables is housed in a guide and wherein the coupling provision of said at least one push/pull cable in a first position is disengaged from said guide and disconnected from the other coupling provision of the other push/pull cable, and is configured to be moved from said first position into the guide to a second position in which it is urged by said guide into connection with said other coupling provision of the other push/pull cable such as to connect both push/pull cables, and is configured to, starting from said second position, be moved for again assuming its first position in which it is automatically disconnected from the other coupling provision such as to disconnect both push/pull cables.

2. The assembly according to claim 1, wherein the coupling provision of the second push/pull cable housed in said guide cooperates with said guide.

3. The assembly according to claim 1, wherein the coupling provision that cooperates with said guide is spring loaded to a position in which both push/pull cables are not connected.

4. The assembly according to claim 3, wherein the spring load is caused by an inherent resiliency of said coupling provision.

5. The assembly according to claim 1, wherein said guide has a flared end configured to engage the coupling provision.

6. The assembly according to claim 1, wherein the coupling provision that cooperates with said guide comprises a latch which in a rotatable manner is attached to the corresponding facing end of the respective push/pull cable, whereas the coupling provision of the other push/pull cable is provided with a counterpart, such that the latch, when rotated through cooperation with the guide, engages said counterpart to connect both push/pull cables.

7. The assembly according to claim 6, wherein the counterpart includes a protrusion behind which, or a recess in which the latch engages.

8. The assembly according to claim 6, wherein the latch comprises two arms extending in different directions of which a first arm cooperates with the guide and a second arm that engages the counterpart.

9. The assembly according to claim 1, wherein the coupling provision that cooperates with said guide comprises at least one gripper member attached to the corresponding facing end of the respective push/pull cable, whereas the coupling provision of the other push/pull cable is provided with a counterpart, such that the gripper member, when moved inwardly through cooperation with the guide, engages said counterpart to connect both push/pull cables.

10. The assembly according to claim 9, comprising two spaced gripper members movable towards each other through cooperation with the guide.

11. The assembly according to claim 9, wherein the counterpart includes a protrusion behind which, or a recess in which the at least one gripper member engages.

12. The assembly according to claim 9, wherein the at least one gripper member comprises a serration configured to engage the counterpart.

13. The assembly according to claim 12, wherein the counter part is defined by a spiral shaped outer surface of the respective push/pull cable.

14. The assembly according to claim 12, wherein the counterpart has a substantially smooth surface.

15. The assembly according to claim 1, wherein at least one of said push/pull cables is provided with a guide member configured to cooperate with a corresponding part of the respective guide to prevent a rotation of said push/pull cable.

16. The assembly according to claim 1, wherein the first and second push/pull cables are configured to move in line with each other.

17. The assembly according to claim 1, wherein the first and second push/pull cables are part of an open roof construction for a vehicle.

18. An assembly for operatively connecting a first push/pull cable which is capable of a to and fro movement, with a second push/pull cable, in such a manner that the second push/pull cable, when connected to the first push/pull cable, will move in correspondence with the first push/pull cable, wherein the first and second push/pull cables are provided with first and second facing ends, respectively, provided with cooperating first and second coupling provisions, respectively, wherein at least one of said push/pull cables is housed in a guide having a component configured to engage at least one of the first or the second coupling provisions when the at least one coupling provision is moved in a longitudinal direction within the guide to move said at least one coupling provision from a first position disengaged from the guide for disengaging the other coupling provision to a second position within and engaged by the guide for engaging the other coupling provision in which both push/pull cables coupling provisions are connected, the at least one of said push/pull cables coupling provision configured to be moved from the first position disengaged from the guide into the guide to the coupling provision second position in which it is urged by said guide into connection with said other coupling provision of the other push/pull cable such as to connect both push/pull cables.

19. The assembly according to claim 18, wherein movement of the at least one coupling provision from the disengaged to the engaged position occurs at least partially normal to a direction of the longitudinal direction within the guide.

* * * * *